United States Patent
Duhme et al.

(10) Patent No.: US 9,868,384 B2
(45) Date of Patent: Jan. 16, 2018

(54) LIGHTING UNIT FOR A MOTOR VEHICLE

(71) Applicant: Hella KGaA Hueck & Co., Lippstadt (DE)

(72) Inventors: David Duhme, Lippstadt (DE); Werner Kösters, Lippstadt (DE); Josef Studniorz, Wadersloh (DE)

(73) Assignee: Hella KGaA Hueck & Co., Lippstadt (DE)

( * ) Notice: Subject to any disclaimer, the term of this patent is extended or adjusted under 35 U.S.C. 154(b) by 210 days.

(21) Appl. No.: 14/513,775

(22) Filed: Oct. 14, 2014

(65) Prior Publication Data

US 2015/0109811 A1 Apr. 23, 2015

(30) Foreign Application Priority Data

Oct. 18, 2013 (DE) .......... 10 2013 111 518

(51) Int. Cl.
*B60Q 1/00* (2006.01)
*F21S 8/10* (2006.01)

(52) U.S. Cl.
CPC ........ *B60Q 1/0094* (2013.01); *F21S 48/1104* (2013.01); *F21S 48/115* (2013.01); *F21S 48/1154* (2013.01); *F21S 48/1305* (2013.01); *F21S 48/211* (2013.01); *F21S 48/215* (2013.01); *F21S 48/232* (2013.01); *F21S 48/30* (2013.01); *F21S 48/32* (2013.01); *F21S 48/321* (2013.01); *F21S 48/323* (2013.01); *F21S 48/328* (2013.01)

(58) Field of Classification Search
CPC .. F21S 48/1104; F21S 48/1154; F21S 48/211; F21S 48/32; F21S 48/328; F21S 48/76; F21S 48/2265; F21S 48/115; F21S 48/1305; F21S 48/232; F21S 48/215; F21S 48/30; F21S 48/321; F21S 48/323; B60Q 1/0094
USPC ................ 362/249.02, 294, 373, 545–549
See application file for complete search history.

(56) References Cited

U.S. PATENT DOCUMENTS 7,942,549 B2 * 5/2011 Li .......... F21V 29/004
362/249.02

FOREIGN PATENT DOCUMENTS

| AT | 505154 A4 | 11/2008 |
|----|-----------|---------|
| DE | 19543852 A1 | 5/1997 |
| DE | 202004003793 U1 | 6/2004 |
| DE | 10306130 A1 | 8/2004 |
| DE | 102011004746 A1 | 8/2012 |

* cited by examiner

*Primary Examiner* — Elmito Breval
*Assistant Examiner* — Naomi M Wolford
(74) *Attorney, Agent, or Firm* — Husch Blackwell LLP

(57) ABSTRACT

A device for a motor vehicle with an electronics unit, which is used to control an electric component, and which is arranged on a cooling element for cooling the electronics unit. Provision has been made that the cooling element basically consists of metal and the cooling element encloses the electronics unit in such a way that it results in an electromagnetic shield of the electronics unit.

5 Claims, 3 Drawing Sheets

LIGHTING UNIT FOR A MOTOR VEHICLE

CROSS REFERENCE

This application claims priority to German Application No. 10 2013 111518.7, filed Oct. 18, 2013, which is hereby incorporated by reference.

TECHNICAL FIELD

The invention relates to a lighting unit device for a motor vehicle.

BACKGROUND

It is known to use a device with an electronics unit for a motor vehicle for controlling an electric component. The operation of an electronics unit generates heat, wherein also an undesired electromagnetic radiation may emanate from the electronic unit. In the process, the resulting heat of the electronics unit is discharged to the environment via a cooling element, which, is attached to the electronics element. At the same time, the electronics unit is shielded in an electromagnetic manner from the electromagnetic beams by means of a shielding plate. However, it proved to be of disadvantage that the mounting of the shielding plate to the electronics unit involves additional installation costs. Moreover, an additional component has to be provided, which increases the costs for the entire device.

SUMMARY OF THE INVENTION

Therefore, the present invention has the objective of providing a device for a motor vehicle which has an electronics unit, wherein the device has a simple and reliable design, especially that the electronics unit is shielded in an electromagnetic manner without using a shielding plate.

The invention discloses a device for a motor vehicle with an electronics unit. The electronics unit is used for controlling an electric component. For cooling the electronics unit, it is arranged at a cooling element. According to the invention, provision has been made that the cooling element basically consists of metal, and the cooling element comprises the electronics unit and the electric component in such a way that the electronics unit is shielded in an electromagnetic manner. In addition, the cooling element has a receiving unit with a first opening, wherein the electronics unit is arranged in the receiving unit. According to the invention, the first opening and/or the second opening have a maximum diameter of approximately 15 mm, by means of which an electromagnetic shield of below 5 GHz is achieved. According to the invention, the electric component involves an LED. Because of the fact that the cooling element comprises the electronic unit in such a way that the electronic unit is shielded in an electromagnetic manner, the electromagnetic shielding can be performed without using a shielding plate. Advantageously, this eliminates an additional component for shielding the electronics unit in an electromagnetic manner, resulting in considerable cost-reduction when producing the device. The entire cooling element can consist of metal, wherein advantageously the cooling element can be provided with cooling fins for cooling the electronics unit. At the same time, the cooling element can completely cover the electronics unit. The cooling element can be connected to a ground potential. Accordingly, the electronic unit is shielded by means of the cooling element, wherein electromagnetic fields are shielded from the electronics unit. Reversely, the environment of the cooling element is protected by the cooling element from the undesired electromagnetic radiation emitted by the electronics unit. At the same time, the electric component can be arranged at the electronics unit. In addition, the electronics unit and the electric component are covered by the cooling element. At the same time, said enclosure of the electronics unit can be understood in such a way that the cooling element basically covers the electronics unit. This basic cover means that the cooling element has at least one opening which, however, does not interfere with shielding the electronics unit according to the laws of physics.

According to the invention, the cooling element has a receiving unit with a first opening, wherein the electronics unit is arranged in the receiving unit. The receiving unit can be produced by means of a drill hole in the cooling element. It is also possible to incorporate the receiving unit already when manufacturing the cooling element. The cooling element can be manufactured by means of a casting process, wherein metals are used for the casting process. The electronics unit can be inserted through the first opening through which the receiving unit can be reached, wherein the receiving unit can have at least the dimensions of the electronics unit. To achieve sufficient absorption of the electromagnetic waves, the opening may be maximally $\lambda/4$. To ensure absorption up to 5 GHz, the opening may be maximally 15 mm. In addition, the opening can have further first openings, wherein the further first openings may also be maximally 15 mm for absorption up to 5 GHz.

Furthermore, it is advantageous that the receiving unit has mounting devices for connecting the electronics unit. The mounting devices used can involve snap-in hooks, wherein the snap-in hooks can fix the electronics unit to the cooling element in such a way that the electronics unit cannot shift in the receiving unit of the cooling element. Accordingly, the snap-in hooks can be arranged in a form-fit manner at the electronics unit. It is also possible to use spacers, which can be arranged at the cooling element. The spacers can be arranged at the cooling element in such a way that the electronics unit can be positioned at the spacers. The electronics unit can be fixed to the spacers by means of a screw connection or by means of adhesion. It is also possible that the receiving unit of the cooling element has at least one groove, wherein the electronics unit has at least one complimentary spring, wherein the complimentary spring can be placed in the groove. At the same time, provision can be made that the cooling elements designed in two parts, wherein the receiving unit the reception is performed by assembling a first part of the cooling element and a second part of the cooling element. At the same time, the first part of the cooling element can consist of a spherical shell which can form the spherical body by means of a second spherical shell. The receiving unit is formed by putting together the first spherical shell and the second spherical shell, wherein the electric unit can be arranged inside the receiving unit. It is also possible to use different designs, for example, a two-part building block or any three-dimensional design which can form a receiving unit.

Furthermore, it is advantageous that the cooling element has a second opening and the second opening is closed by means of a locking element, wherein the locking element basically consists of metal. At the same time, the second opening can have a larger cross section than the first opening. The receiving unit can be reached by means of the second opening in that, through the second opening, for example, mounting devices are arranged at the receiving unit. As far as assembly is concerned, by means of an enlarged second opening, it is also easier to arrange additional components at the receiving unit. It is also possible that the electronics unit is inserted into the receiving unit by means of the second opening. To ensure an electromagnetic shield, the second opening can be closed by means of a locking element which basically consists of metal. At the same time, the locking element can be connected to ground. The locking element can consist of metal. In addition, it is possible that the locking element has a wire mesh, wherein the wire mesh is injection-molded with a plastic material. Accordingly, it is also possible that the cooling element has a wire mesh which is also injection-molded with a plastic material. By means of a screw used to attach the locking element to the cooling element, an electrical connection can be established between the wire mesh of the locking element and the wire mesh of the cooling element. For this purpose, the screw has to be electrically conducting, which is possible when using a metal screw. In addition, the locking element can involve an electronic circuit board, wherein a copper layer can be applied at least on one side of the electronic circuit board. Then the electronic circuit board can be arranged at the second opening in such a way that the second opening is covered by the copper layer.

According to the invention, the first opening and/or the second opening have a maximum diameter of approximately 15 mm, by means of which an electromagnetic shield below 5 GHz is achieved. To achieve an absorption up to a specific limit frequency, for example, 5 GHz, openings with a maximum diameter of $\lambda/4$ may be available. This is calculated from the physical law $c=\lambda*f$, wherein c corresponds to the velocity of propagation of electromagnetic waves and f to the limit frequency to be absorbed. Accordingly, the value of 15 mm for $\lambda/4$ results from a velocity of propagation of 300.000 km/s and a limit frequency of 5 GHz. This means the higher the limit frequency to the electromagnetic shield is selected the smaller may be the maximum diameter of the first and/or second opening.

Furthermore, according to the invention, the electric component involves an LED. Using an illuminant has the advantage that the device can be used as a lighting system for a motor vehicle. In the process, at least one LED is used. The at least one LED can be assembled on the electronics unit in SMD (Surface Mounted Device) design. Advantageously, the electronics unit can have a double-sided board, wherein the illuminants can be arranged on a first surface of the board. At the same time, the board can consist of fiber-reinforced plastic material, wherein the first surface and/or the second surface of the board are provided with a thin layer of copper. Conducting paths can be etched from the thin copper layer. The energy supply of the electronics unit can be provided by means of an electric cable via the first and/or second opening.

According to the invention, it is also possible that the illuminant is arranged at the first opening in such a way that emitable light of the illuminant can penetrate the first opening. To focus the emitable light of the illuminant, a lens can be arranged t the first opening. The lens can also be used for diffusing the emitable light of the illuminant. In addition, further optical components, for example, a reflector, can be used. At the same time, the illuminant at the first opening can be arranged in such a way that the illuminant is mounted in the receiving unit of the cooling element. Furthermore, it is possible that the illuminant protrudes from the first opening of the cooling element. For this purpose, the illuminant can be arranged on a first end of the electronics unit, wherein the electronics unit is completely enclosed by the cooling element and only the illuminant in its physical, spatial dimension protrudes from the first opening.

In the context of the invention, a reflector can be directly attached to the cooling element. Advantageously, the reflector is designed in one piece with the cooling element, especially consisting of the same material. This improves the thermal conductivity of the cooling element, because it results in a considerably enlarged surface. In addition, a further assembly step is eliminated in which the cooling element and the reflector have to be combined. According to the invention, it is possible that the reflector injected and/or molded to the cooling element. For this purpose, the cooling element can be designed in the form of leafs, bars or a ribbed body. Furthermore, it is possible that the cooling element has cooling stars or cooling fins, which further increases the surface of the cooling element, thus improving convection. It is especially advantageous when magnesium is used as material for producing the reflector and the cooling element. Magnesium has excellent thermal conductivity and at the same time provides an electromagnetic shield. In addition, magnesium is a light-weight material, approximately one third lighter than aluminum and thus saves weight, which has an ecologically positive effect. Furthermore, the invention-based product involves a multi-component part. It is also possible that at least part of the electronics unit is formed by the reflector and/or the cooling element. At the same time, portions of the electronics unit can be injected and/or molded to the reflector and/or to the cooling element.

According to the invention, it is possible that a fluid is filled into the receiving unit, wherein the electronics unit is cooled through convection of the fluid. At the same time, the electronics unit is arranged in the receiving unit at a distance from the cooling element. Because of this spacing, an expansion space is formed, which can be filled with the fluid. The fluid can involve air or water or the like. When the electronics unit is heated, it is possible that via the convection of the fluid a heat exchange takes place between the electronics unit and the cooling element. Via an external wall of the cooling element, the heat can be released into the environment. It is also possible that the electronics unit comes in direct with the cooling element so that via thermal conductivity between electronics unit and cooling element heat is released to the environment of the cooling element.

Advantageously, the invention-based device can be used for a lighting unit of a motor vehicle, wherein the lighting, unit of the motor vehicle can involve a motor vehicle headlight or a signal lamp for a motor vehicle.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
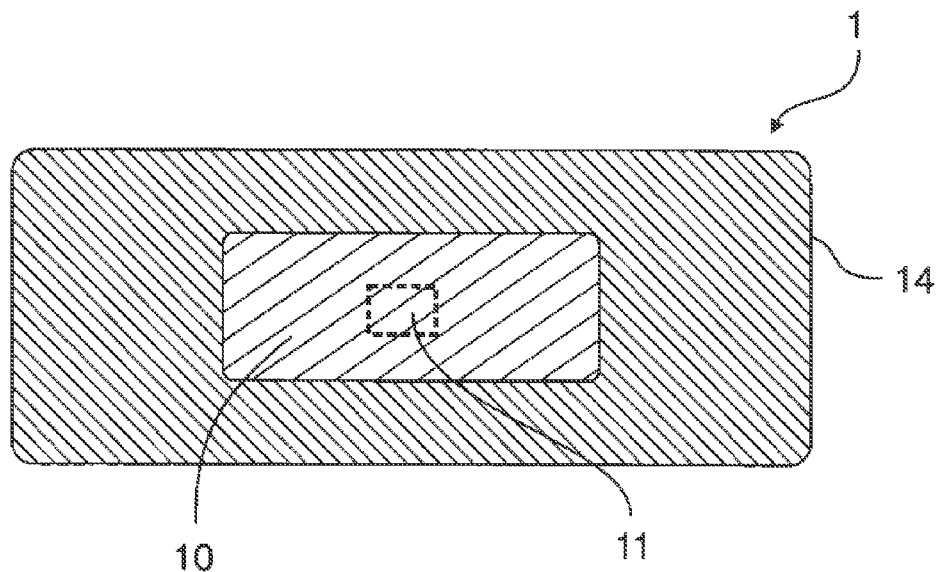
FIG. 1 is a sectional representation of an invention-based device with a cooling element.

FIG. 1 shows a sectional representation of a device 1, wherein the device 1 comprises a cooling element 14, wherein the cooling element 14 encloses an electronics unit 10. At the same time, the electronics unit 10 is completely enclosed by the cooling element 14. This means that the cooling element 14 completely surrounds the electronics unit 10. The electronics unit 10 has an electronic component 11, wherein by means of the enclosure of the cooling element, which basically consists of metal, an electromagnetic shield is created for the electronics unit 10 and the electric component 11.

Figure 2:
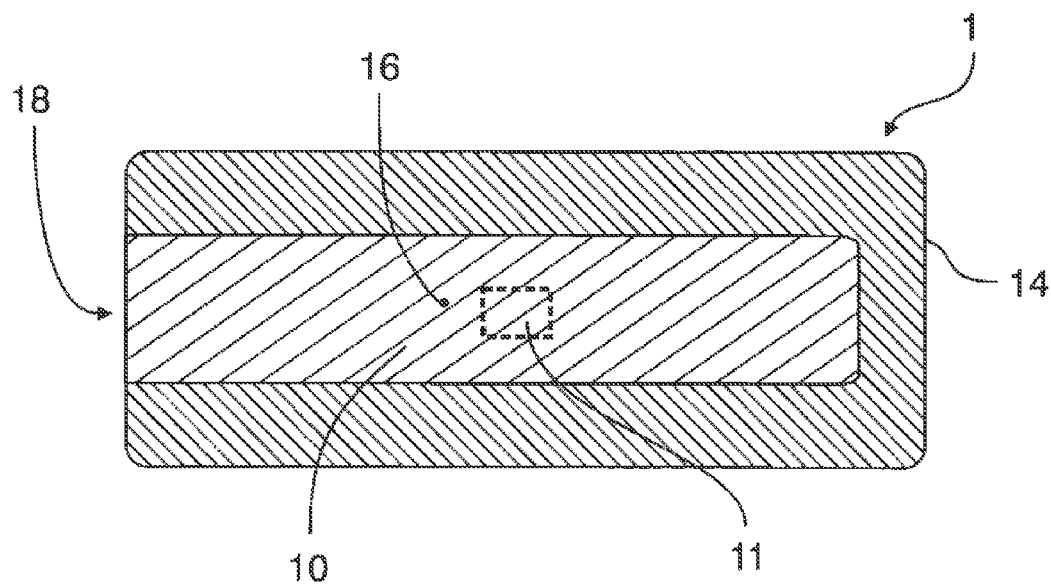
FIG. 2 is a sectional representation of an invention-based device, wherein the cooling element comprises a first opening.

FIG. 2 shows a sectional representation of a device 1, wherein the device 1 comprises a cooling element 14 with a first opening 18. At the same time, the cooling element 14 encloses an electronics unit 10. An electric component 11 is arranged at the electronics unit 10. Said electric component 11 can involve an electronic component. It is also possible that multiple electronic components are arranged as electric components 11 at the electronics unit 10. Advantageously, the first opening 18 has a diameter that allows the electronics unit 10 to be pushed through the opening 18. As a result, the electronics unit 10 can be inserted through the first opening 18 into a receiving unit 16 of the cooling element 14. At the same time, the cooling element 14 encloses the electronics unit 10 in such a way that no part of the electronics unit 10 protrudes from the first opening 18. The electronics unit 10 is directly resting against an internal surface of the cooling element 14. As a result, it is possible that heat, which is generated when operating the electronics unit 10, is directly released via thermal conductivity, via the cooling element 14, into the environment of the cooling element 14.

Figure 3:
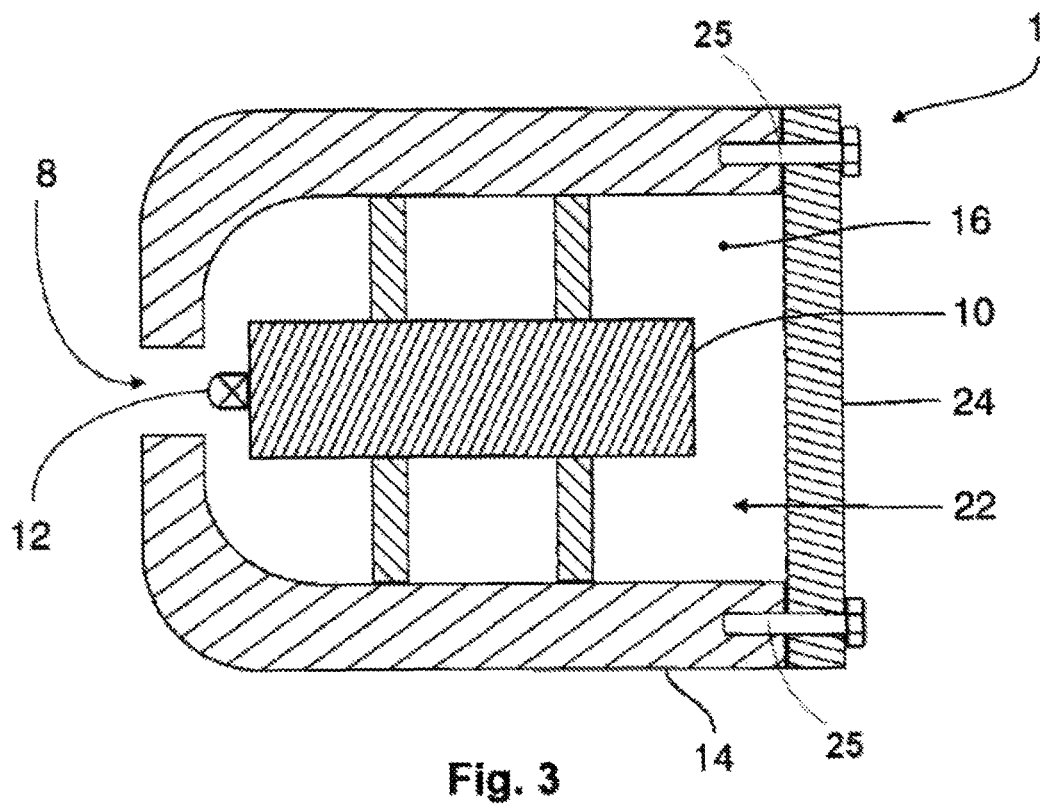
FIG. 3 is a sectional representation of an invention-based device, wherein an electronics unit with an illuminant is arranged in a receiving unit.

FIG. 3 shows a sectional representation of a device 1, wherein the device 1 comprises a cooling element 14 with a receiving unit 16. An electronics unit 10 is arranged in the receiving unit 16. The electronics unit 10 is arranged by means of spacers, wherein the electronics unit 10 is arranged opposite of the first opening 18. On a first surface of the electronics unit 10 an illuminant 12 is arranged as an electric component. The cooling element 14 has a shell-like design, wherein at the cooling element 14 a second opening 22 is arranged opposite of the first opening 18. The receiving unit 16 of the cooling element 14 can be attained by means of the second opening 22. At the same time, the insertion of the electronics unit 10 into the receiving unit 16 of the cooling element 14 is performed by means of the second opening 22. The second opening 22 is closed by means of a locking element 24. The locking element 24 basically consists of metal. At the same time, a metal mesh can be used, wherein the metal mesh can be surrounded with plastic material. The locking element 24 can also consist completely of metal, i.e., it can be closed with a cover plate. The locking element 24 is fixed with a screw connection 25. For this purpose, metal screws can be used, which can also be used to form an electrical connection between the locking element 24 and the cooling element 14, especially when a metal mesh is used in the cooling element 14 and the locking element 24.

Figure 4:
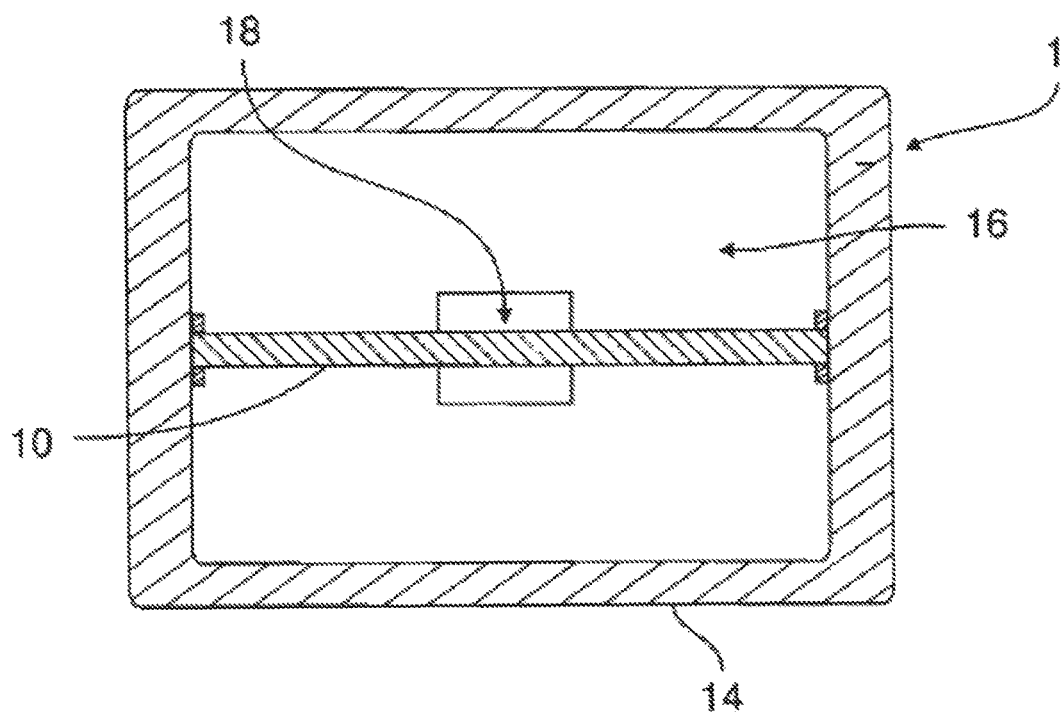
FIG. 4 is a sectional representation of an invention-based device, wherein an electronics unit is arranged via retaining elements in a receiving unit of a cooling element.

FIG. 4 shows a sectional representation of a device 1, wherein the device 1 has a cooling element 14. The cooling element 14 has a receiving unit 16, wherein an electronics unit 10 is arranged in the receiving unit 16. In the interior of the cooling element 14, retaining elements are arranged, wherein the retaining elements are placed in the form of rails on a left side of the cooling element 14 and a right side of the cooling element 14, respectively. As a result, a groove is formed on the left side and the right side of the cooling element 14. The electronics unit 16 can be inserted into this groove, wherein a left side of the electronics unit 10 and right side of the electronics unit 10 functions as a spring. On one end of the electronics unit 16 (not shown here) an illuminant can be arranged, wherein the illuminant is arranged at a first opening 18 in such a way that emitable light of the illuminant can penetrate the first opening 18. The receiving unit 16 is designed in such a way that an expansion space is formed between the electronics unit 10 and an internal side of the cooling element 14 when an electronics unit 10 is inserted. A fluid is filled into this expansion space, for example, air, wherein the heat generated by the electronics unit 10 can be released via convection to the environment of the cooling element 14.

Figure 5:
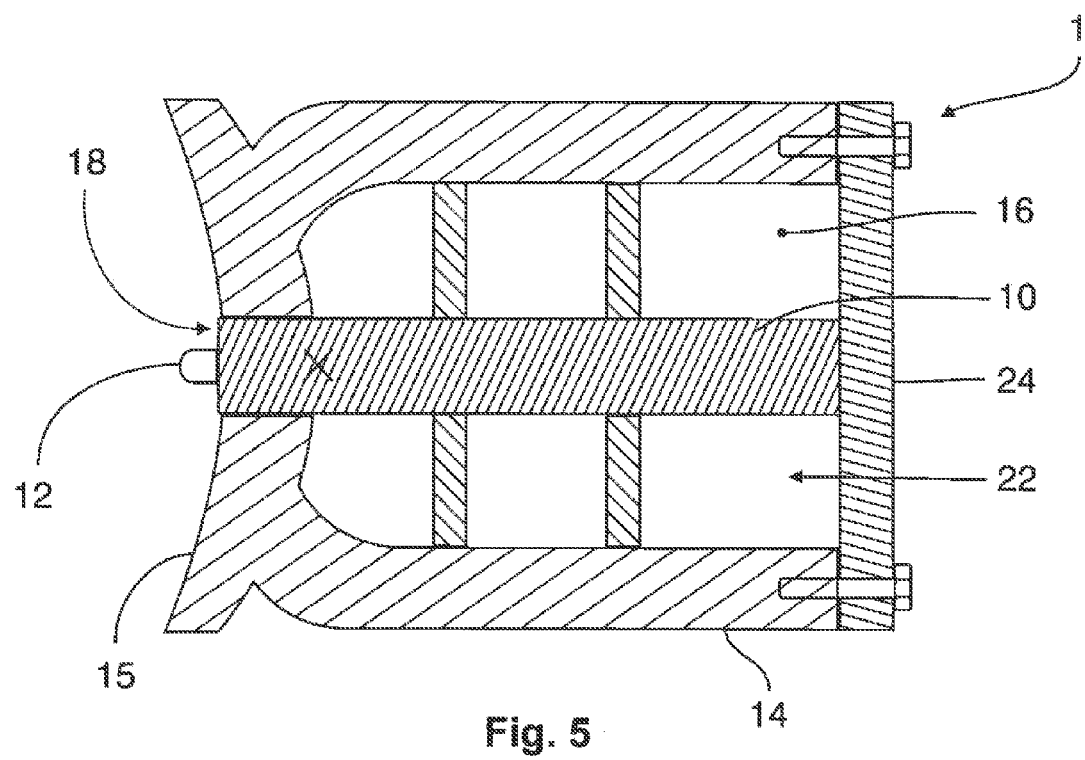
FIG. 5 is a sectional representation of an invention-based device, wherein cooling element and reflector are designed in one piece.

FIG. 5 shows a sectional representation of an invention-based device 1, wherein the reflector 15 is designed as one piece with the cooling element. Accordingly, the reflector 15 has a first opening 18, in which the illuminant 12 is located. The electronics unit 10 is inserted in the receiving unit 16 and is surrounded by the cooling element and the reflector 15 in such a way that an electromagnetic shield, as well as a thermally optimized design, result in the release of heat.

Figure 6:
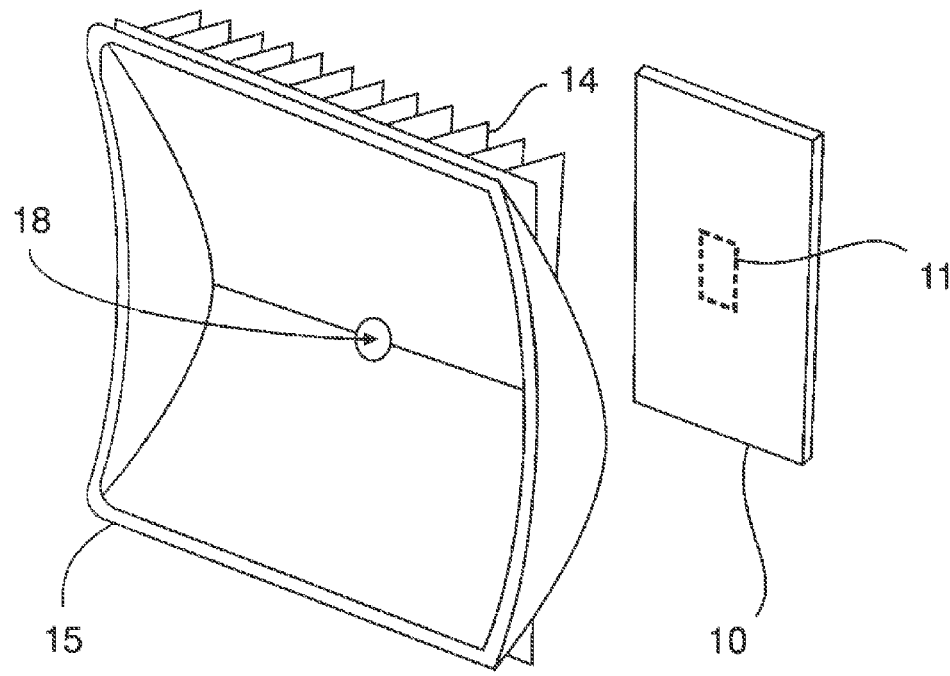
FIG. 6 is a further sectional representation of an invention-based device, wherein the cooling element and the reflector are designed in one piece

FIG. 6 shows a further sectional representation of an invention-based device 1, in which the cooling element 14 is designed as one piece with the reflector 15. In the embodiment shown, the cooling element 14 is designed in the form of cooling fins 14, which are arranged directly at the reflector 15, or the rear side of the reflector 15. The cooling fins 14 expand the surface of the reflector 15, so that the reflector is used as a cooling element 14 for discharging the heat and, at the same time, shields in an electromagnetic manner the electronics unit 10. The at least first opening 18 for receiving the electronic components 11 is provided in the reflector 15. The electronics unit 10 is inserted into the cooling element by way of a receiving unit 16 (not shown) on the rear side of the reflector 15. As a result, the electronics unit 10 is almost completely surrounded by the cooling element 14 and the electronic component is received in the at least first opening 18.

REFERENCE LIST

1 Device
10 Electronics unit
11 Components
12 Illuminant
14 Cooling element
15 Reflector
16 Receiving unit
18 First opening
22 Second opening
24 Locking element
25 Screw Connection

The invention claimed is:
1. A device for a motor vehicle comprising:
an electronics unit used for controlling an electric component including an LED;
a cooling element consisting of metal for cooling the electronics unit, a receiving unit formed as a cavity in the cooling element, the receiving unit having a first end portion and a closed second end portion opposing the first end portion;

a first opening provided in the first end portion arranged in substantial alignment with an emission direction of the LED so that emitted light from the LED penetrates the first opening, wherein the electronics unit is arranged in the receiving unit, wherein the cooling element is arranged with respect to the electronics unit and the electric component in such a way that the cooling element acts as an electromagnetic shield for the electronics unit, wherein the first opening has a maximum diameter of 15 mm, by means of which the cooling element achieves an absorption below 5 GHz.

2. The device according to claim 1, wherein the receiving unit comprises mounting devices for connecting the receiving unit to the electronics unit.

3. The device according to claim 1, wherein the cooling element has a second opening and the second opening is closed by means of a locking element, wherein the locking element consists of metal.

4. The device according to claim 1 wherein a locking element is connected to the cooling element with a screw connection.

5. The device according to claim 1 wherein a fluid is filled into the receiving unit, wherein the electronics unit is cooled by means of a convection of the fluid.

* * * * *